United States Patent
Hashimoto et al.

(10) Patent No.: US 6,213,070 B1
(45) Date of Patent: Apr. 10, 2001

(54) CONTROL APPARATUS FOR INTERNAL COMBUSTION ENGINE

(75) Inventors: Atsuko Hashimoto; Koji Wada; Takeshi Kawakami, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/531,222

(22) Filed: Mar. 20, 2000

(30) Foreign Application Priority Data

Sep. 21, 1999 (JP) .................................................. 11-267194

(51) Int. Cl.$^7$ ................................ F02D 13/02; F01L 1/34

(52) U.S. Cl. ..................................... 123/90.15; 123/90.17

(58) Field of Search ............................. 123/90.15, 90.16, 123/90.17, 90.31

(56) References Cited

U.S. PATENT DOCUMENTS 5,611,304 * 3/1997 Shinojima .......................... 123/90.15
5,937,808 * 8/1999 Kako et al. ........................ 123/90.15
5,957,095 * 9/1999 Kako ................................. 123/90.15

FOREIGN PATENT DOCUMENTS 6-159021   6/1994 (JP) .

* cited by examiner

Primary Examiner—Weilun Lo
(74) Attorney, Agent, or Firm—Sughrue, Mion, Zinn, Macpeak & Seas, PLLC

(57) ABSTRACT

When an internal combustion engine is run at a high speed revolution, a large increase in a processing time executed every predetermined crank angle position can be suppressed, and fluctuations or variations in response characteristics can be reduced, thus enabling better valve timing control. To this end, a control apparatus for an internal combustion engine includes a variable valve timing mechanism, an actual advance amount detector for detecting an actual valve timing position every predetermined crank angle position, a target advance amount setter for setting a target valve timing based upon a detection result of the operating condition detector, a controller for controlling the variable valve timing mechanism, an advance amount deviation calculator for calculating a deviation between the target advance amount and the actual advance amount every predetermined crank angle position, a differential value calculator for calculating, every predetermined time, a deviation between a current value of advance amount deviation and a preceding value thereof, and a control amount calculator for calculating a control amount used in the controller based upon both the advance amount deviation and the differential value.

4 Claims, 13 Drawing Sheets

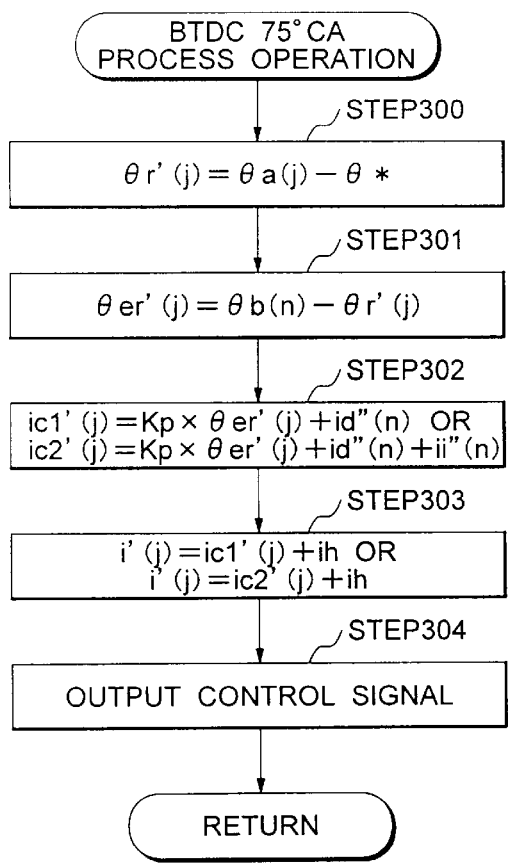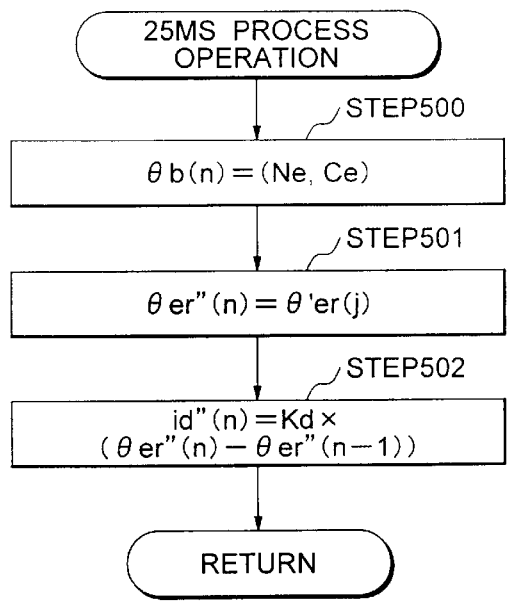
FIG. 4(a)
FIG. 4(b)

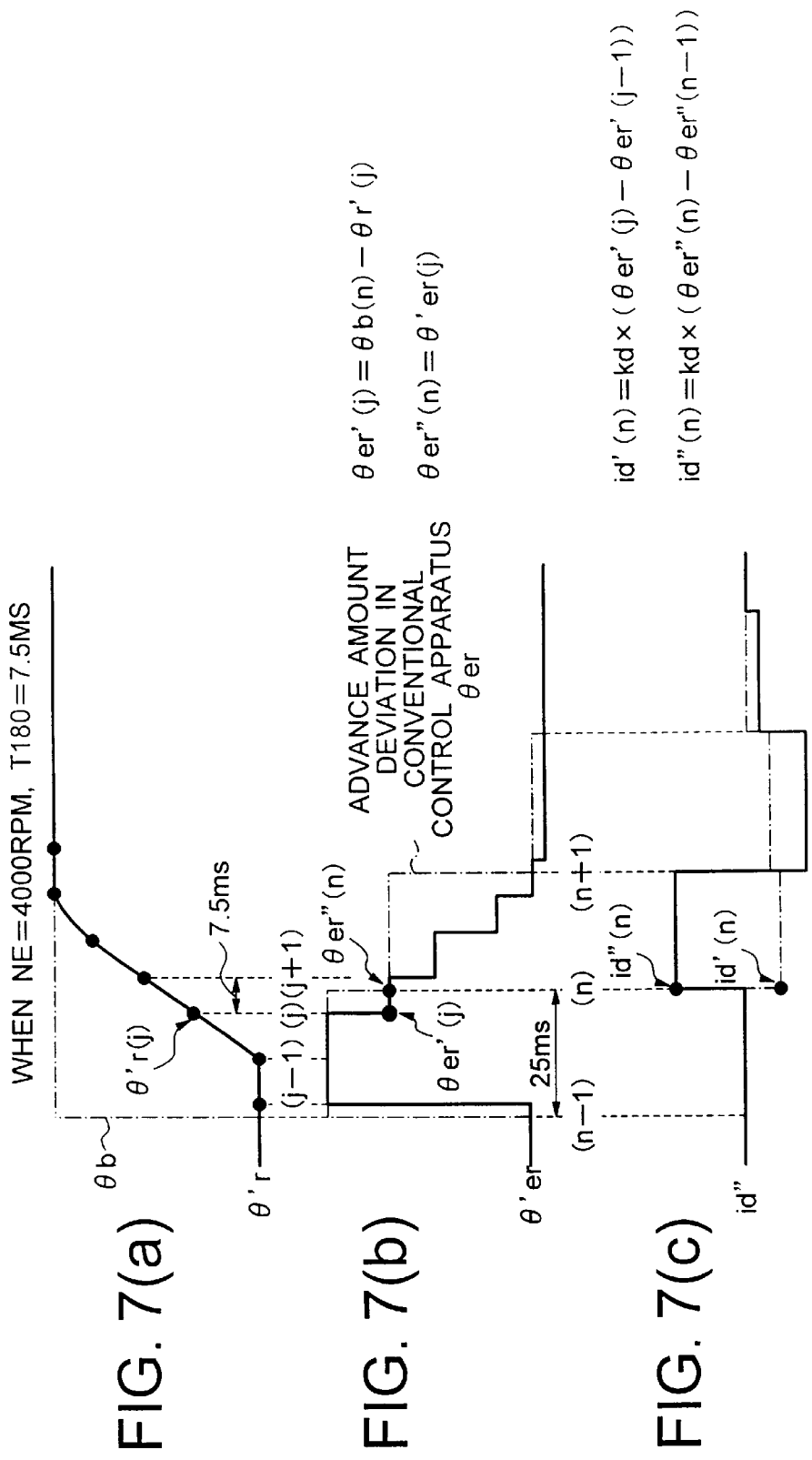

PRIOR ART
FIG. 12(a)  CRANK ANGLE/POSITION DETECTION SIGNAL SGT

PRIOR ART
FIG. 12(b)  CAM ANGLE/POSITION DETECTION SIGNAL (MOST RETARDED ANGLE) SGC*

PRIOR ART
FIG. 12(c)  CAM ANGLE/POSITION DETECTION SIGNAL (ADVANCE ANGLE) SGCa $$\theta a(j) = \frac{Ta(j)}{T110(j)} \times 110 [°CA] \quad \cdots (1)$$

CONTROL APPARATUS FOR INTERNAL COMBUSTION ENGINE

BACKGROUND OF THE INVENTION

1. Field of the Invention

The present invention relates generally to a control apparatus for an internal combustion engine equipped with a variable valve timing mechanism. More specifically, the present invention is directed to a control apparatus for controlling a change in valve timing by the variable valve timing mechanism.

2. Description of the Related Art

FIG. 8 schematically shows the arrangement of a conventional control system for an internal combustion engine equipped with a variable valve timing mechanism, as described in Japanese Patent Application Laid-Open No. Hei 6-299876. The conventional control system is an example of a general-purpose system for changing the open/close timing of an intake valve alone.

Now, the conventional internal combustion engine will be explained. In each cylinder 100 (only one cylinder is indicated), a combustion chamber 100a is defined by a piston 101 which is moved for reciprocation in the cylinder 100. An ignition plug 102 is provided in a cylinder head at an upper portion of the combustion chamber 100a, with a tip portion thereof being presented into the combustion chamber 100a. An intake pipe 103 and an exhaust pipe 104 are connected to each cylinder 100. The intake pipe 103 conducts intake air to the combustion chamber 100a. The exhaust pipe 104 is used to exhaust combustion gases from the combustion chamber 100a. An intake valve 117 is provided at an intake port through which the exhaust pipe 104 is opened to the combustion chamber 100a, whereas an exhaust valve 118 is provided at an exhaust port through which the exhaust pipe 104 is opened to the combustion chamber 100a. A throttle valve 108 is provided in the intake pipe 103 for controlling an amount of intake air which is supplied to the combustion chamber 100a. An opening degree of the throttle valve 108 is detected by a throttle sensor 112 mounted on the intake pipe 103 in the vicinity of the throttle valve 108. Also, within the intake pipe 103, both a fuel injection valve 105 and a pressure sensor 113 are provided on the downstream side of the throttle valve 108. The fuel injection valve 105 is to supply or inject fuel to the intake pipe 103. The pressure sensor 113 is to detect the pressure in the intake pipe 103. Furthermore, a water temperature sensor 107 for detecting a temperature of engine coolant or cooling water is mounted on the cylinder 100, and an oxygen sensor 106 for detecting an oxygen concentration in exhausted air is provided on the exhaust pipe 104.

Both an intake cam shaft 115 and an exhaust cam shaft 119, by which the respective valves are opened/closed, are arranged above the intake valve 117 and the exhaust valve 118. An intake-side timing pulley 120 and an exhaust-side timing pulley 119a are mounted on the intake cam shaft 115 and the exhaust cam shaft 119. Both the intake-side timing pulley 120 and the exhaust-side timing pulley 119a are operatively coupled via timing belts (not shown) to a crank shaft 116. The crank shaft 116 is coupled via a piston rod 116a to the piston 101 provided in each cylinder 100. As a result, both the intake cam shaft 115 and the exhaust cam shaft 119 are driven to rotate in synchronization with the rotation of the crank shaft 116.

An oil pressure actuator (VVT ACT) 114 driven by lubricating oil of the engine is coupled to an end face of the intake cam shaft 115, and the oil pressure actuator 114 changes open/close timing of the intake valve 117. In other words, the oil pressure actuator 114 changes the displacement angle of the intake cam shaft 115 with respect to the intake-side timing pulley 120 in order to continuously change the open/close timing of the intake valve 117.

An oil control valve (OCV) 121 supplies operating oil to the oil pressure actuator 114, and also adjusts the amount of the operating oil, so that the oil pressure actuator 114 is driven to change the open/close timing of the intake valve 117.

FIG. 8 represents such a system for changing the valve timing of the intake valve 117 alone. Similarly, a system for changing the open/close timing of the exhaust valve 118 may be provided.

A rotary plate 116b having concave/convex portions formed on an outer circumferential portion thereof is fixed to the crank shaft 116. A crank angle sensor 110 is arranged opposite to the outer circumferential portion and in the vicinity of the rotary plate 116b for detecting the concave/convex portion of the outer circmferential portion of the rotary plate 116b, so that this sensor 110 may detect a rotational or angular position of the crank shaft 116 (i.e., crank angle position), and the number of revolutions per minute of the engine (hereinafter referred to as "engine rotational number or speed").

The output signals of various sorts of sensors are inputted into an engine control unit (hereinafter referred to as an "ECU") 122. These sensors include the crank angle sensor 110, the throttle sensor 112, the pressure sensor 113, an intake air sensor (not shown), the water temperature sensor 107, and the like. The ECU 122 detects an operating condition of the engine in response to sensor information, and then controls the ignition plug 102, the fuel injection valve 105, the oil control valve 121 and the like in correspondence with the detected engine operating condition.

FIG. 9 is a schematic block diagram showing a basic arrangement of a conventional control apparatus for an internal combustion engine equipped with the above-described variable valve timing mechanism.

As indicated in FIG. 9, the conventional control apparatus for the internal combustion engine includes an operating condition detector 1, a target advance amount setter 2, an actual advance amount detector 3, an advance amount deviation calculator 4, a control amount calculator 5, a controller 6, and a variable valve timing mechanism 7 to be discussed later. It should be understood that these elements 1 to 6 functionally indicate the control contents of the ECU 122, and these control contents may be executed in a software manner by using a microcomputer and the like.

The operating condition detector 1 detects the operating condition of the internal combustion engine from the information of the output signals derived from various sorts of sensors such as the crank angle sensor 110 for detecting the rotational number of the engine, the throttle sensor 112, the pressure sensor 113, an intake air sensor (not shown), and the water temperature sensor 107, and so on.

The target advance amount setter 2 sets an optimum target valve timing under the detected engine operating condition based upon the detection result of the operating condition detector 1. The target valve timing is previously mapped based upon either the engine rotational number Ne and the charging efficiency Ce, or the engine rotational number Ne and the throttle opening degree. In the case where a predetermined operating condition is satisfied, for example, the engine cooling water temperature becomes higher than or equal to a predetermined temperature (for instance, higher than or equal to 0° C.), the target advance amount setter 2 retrieves the map, and executes an interpolation calculation so as to set an optimum target advance amount "θb". To the contrary, when the predetermined operating condition cannot be satisfied, the target advance amount setter 2 fixes the target advance amount θb to a basic reference position (for example, intake side is fixed to the most retarded angle position, whereas exhaust side is fixed to the most advanced angle position).

The actual advance amount detector 3 detects the actual valve open/close timing (position) based on the output signals derived from the crank angle sensor 110 and the cam angle position detecting sensor 111 by employing the known method.

The advance amount deviation calculator 4 calculates a deviation between the target advance amount θb set by the target advance amount setter 2 and the actual advance amount θr of the open/close position of either the intake valve or the exhaust valve, which is detected by the actual advance amount detector 3.

The control amount calculator 5 calculates the control amount through feedback control based upon the advance amount deviation θer calculated by the advance amount deviation calculator 4 in order that the actual advance amount θr is converged to the target advance amount θb.

The controller 6 outputs a control signal for controlling the variable valve timing mechanism 7 based on the control amount calculated by the control amount calculator 5.

The variable valve timing mechanism 7 is so operated as to continuously change the phase of the intake cam shaft 115 with respect to the crank shaft 116. The variable valve timing mechanism 7 is equipped with the oil pressure actuator 114 mounted on the end face of the cam shaft, and the oil control valve 121 for driving and controlling the oil pressure actuator 114. The oil control valve 121 is equipped with a spool valve 123 which functions as a switching valve for switching the oil path to the oil pressure actuator 114, and a linear solenoid 124 which functions as a drive mechanism for controlling the position of the spool valve 123. The energizing current of the linear solenoid 124 is controlled in response to the control signal outputted from the controller 6 so as to drive the spool valve 123. Thus, the spool valve 123 switches the oil path to the oil pressure actuator 114 in order to adjust the oil amount of the operating oil. As previously explained, the linear solenoid 124 drives the oil pressure actuator 114 so as to change the open/close timing (hereinafter referred to as "valve timing") of the intake valve 117 and also of the exhaust valve 118.

FIG. 10(a) to FIG. 10(c) indicate operating conditions of the oil pressure actuator 114 in such a case that a control current value "i" of the oil control valve 121 by the controller 6 is varied.

FIG. 10(a) shows an operating condition of the oil pressure actuator 114 in the case where the control current value "i" is such a current value "ia" (for instance, 0.1 A) smaller than a reference value "ib" (for example, 0.5 A). At this time, the spool valve 123 is moved to a left side so as to form an oil path as indicated by an arrow. Thus, the operating oil is supplied to a retardation angle (retard angle) chamber 125 of the oil pressure actuator 114, and also the operating oil is exhausted from an advance angle chamber 126, so that the phase of the intake cam shaft 115 is delayed and therefore the open/close timing of the intake valve 117 (hereinafter referred to as "intake valve timing") is brought into a retardation angle control state.

FIG. 10(b) indicates an operating condition of the oil pressure actuator 114 in the case where the control current value "i" is equal to the reference value "ib" (for instance, 0.5 A). At this time, the spool valve 123 is maintained at a position where an oil path switching port is closed, and both the retardation angle chamber 125 and the advance angle chamber 126 of the oil pressure actuator 114 are brought into such conditions that the operating oil is neither supplied nor exhausted. Thus, the phase of the intake cam shaft 115 is maintained under the current state, and also the intake valve timing is brought into a control state for maintaining the current condition.

FIG. 10(c) represents an operating condition of the oil pressure actuator 114 in the case where the control current value "i" is such a current value "ic" (for instance, 0.1 A) larger than the reference value "ib" (for example, 0.5 A). At this time, the spool valve 123 is moved to the right so as to form an oil path as indicated by an arrow. Thus, the operating oil is supplied to the advance angle chamber 126 of the oil pressure actuator 114, and also the operating oil is exhausted from the retardation angle chamber 125, so that the phase of the intake cam shaft 115 is advanced and therefore the intake valve timing is brought into an advance angle control state.

In FIG. 10(a) to FIG. 10(c), the communication degree of switching the oil path is determined by the position of the spool valve 123. There is a direct proportional relationship between the position of the spool valve 123 and the current value "i" of the linear solenoid 124.

FIG. 11 is a characteristic diagram showing a changing speed VTa of actual valve timing with respect to the current value "i" of the linear solenoid 124 under a predetermined operating condition. In this figure, a region where the changing speed VTa is positive indicates that the actual valve timing is moved along the advance angle direction, whereas a region where the changing speed VTa is negative indicates that the actual valve timing is moved along the retardation angle direction.

In FIG. 11, the current values ia, ib, ic show the current values "i" of the linear solenoid 124 corresponding to the respective positions of the spool valve 123 shown in FIG. 10(a), FIG. 10(b) and FIG. 10(c), respectively. As a current value "i" under which the actual valve timing changing speed VTa becomes "0", there is only one current value "ib" by which a total oil amount of the operating oil leaked from the retardation angle chamber 125, the advance angle chamber 126, an oil pressure pipe (not shown), and the spool valve 123 can be made balance with a total oil amount of operating oil pressure-fed from an oil pump (not shown).

It should be understood that since the reference value "ib" for the control current value of the oil control valve 121 is varied depending upon fluctuations in the dimensions of the spool valve 123 and the operating conditions of the engine such as the engine rotational number and the engine temperature, this reference value is required to be updated as the holding current value "ih" in the learning manner under predetermined conditions (for example, in the case where actual advance amount θr≦target advance amount θb±1° CA).

Therefore, the following description will be made under such a condition that the current value "ib" for maintaining the actual valve timing unchanged (i.e., the current condition is maintained) is employed as the holding current value "ih". In other words, when the valve timing is desired to be advanced, the control current value "i" may be set to be larger than the holding current value "ih". Conversely, when the valve timing is to be retarded, the control current value "i" may be set to be smaller than the holding current value "ih".

Next, a description will be made of the detection of the actual valve timing by the actual advance amount detector 3 while referring to FIGS. 12(a) through 12(c).

FIG. 12(a) is a timing chart indicating a crank angle position detection signal SGT (hereinafter referred to as a "signal SGT") corresponding to the output signal derived from the crank angle sensor 110. FIG. 12(b) and FIG. 12(c) are timing charts showing cam angle position detection signals SGC (hereinafter referred to as "signal SGC") corresponding to the output signals derived from the cam angle position detecting sensor 11 at the most spark retarded position and at an advanced position, respectively. Generally speaking, the signal SGT is employed so as to detect the rotational number Ne of the engine, as well as to detect such a fact that the crank shaft 116 is located at a predetermined reference crank angle position.

First, to detect the actual advance amount θr, as discussed later, an actual valve timing detection value "θa" is calculated from a phase relationship between the signal SGT and the signal SGC.

A signal SGC* of FIG. 12(b) indicates such a signal SGC derived when the valve timing is the most retarded angle position. A signal SGCa of FIG. 12(c) shows such a signal SGC derived when the valve timing is advanced.

As shown in FIGS. 12(a) through 12(c), the ECU 122 measures a time duration T110 corresponding to a crank angle of 110° CA in the signal SGT of FIG. 12(a) every predetermined crank angle position (for instance, BTDC75° CA) equal to the reference timing of the signal SGT. Also, the ECU 122 measures a phase difference time duration Ta which is defined from the signal SGC up to the signal SGT, and it calculates the actual valve timing detection value θa in accordance with the following formula (1):

$$\theta a(j)=Ta(j)/T110(j)\times 110[° CA] \qquad (1).$$

Also, under a predetermined stable operating condition of the engine such as an idle operating condition, the actual valve timing detection value θa, detected when the target advance amount θb is at the most retarded angle position (θb=0), is stored as a most retarded angle learning value "θ*". The most retarded angle learning value θ* constitutes a reference value used to calculate the actual advance amount θr of the actual valve timing. This reference value is set so as to absorb detection differences occurring with respective systems employed. The detection differences are caused by variations in the component parts as well as variations in the mounting of the oil pressure actuator 114, the crank angle sensor 110 and the cam angle position detecting sensor 111. Also, in order to perform precise control, the most retarded angle learning value θ* is frequently updated in a short time period, for example, every time a predetermined time (e.g., 25 ms) passes, or every predetermined crank angle position (e.g., BTDC75° CA) of the signal SGT.

Next, a description will now be made of the control content of a variable valve timing control operation. Conventionally, the content of the valve timing control is well known in the related field, as known from, for example, Japanese Patent Application Laid-Open No. Hei 6-159021.

The ECU 122 executes feedback control based upon a deviation θer between the target advance amount θb and the actual advance amount θr every time a predetermined time passes (e.g., 25 ms) in order that the actual advance amount θr can be converged to the target advance amount θb.

FIG. 13 is a flow chart describing the control operation of the above-explained conventional control apparatus. The routine shown therein is processed every predetermined time (e.g., 25 ms).

In FIG. 13, first, at step 200, using the following formula (2), the actual advance amount detector 3 calculates the actual advance amount θr corresponding to the advance amount of the actual valve timing while setting as a reference the most retarded angle learning value "θ*":

$$\theta r(n)=\theta a(j)-\theta *[° CA] \qquad (2)$$

Next, at step 201, an optimum target advance amount θb under the current operating condition is set from a map indicating a relation between the engine rotational number Ne and the charging efficiency Ce as follows:

$$\theta b(n)=(Ne, Ce)[° CA] \qquad (3)$$

Next, at step 202, the advance amount deviation calculator 4 calculates a deviation θer between the target advance amount θb and the actual advance amount θr based upon the following formula (4):

$$\theta er(n)=\theta b(n)-\theta r(n)[° CA] \qquad (4)$$

At step 203, the control amount calculator 5 calculates a control amount ic1(n) based on the following formula (5) in the case where proportional differential control (PD control) is carried out:

$$ic1(n)=ip(n)+id(n)=kp\times\theta er(n)+kd\times(\theta er(n)-\theta er(n-1))[A] \qquad (5),$$

where ip is a proportional value; id is a differential value; Kp is a proportional gain; and kd is a differential gain. Also, when the PID control is performed, the control amount calculator 5 similarly calculates another control amount ic2(n) in the PID control based on the following formula (6):

$$ic2(n)=ip(n)+id(n)+ii(n)=kp\times\theta er(n)+kd\times(\theta er(n)-\theta er(n-1))+\Sigma Ki(n) [A] \qquad (6)$$

where ip is a proportional value; id is a differential value; and ΣKi represents an integral value, namely ΣKi(n)=ΣKi(n−1)+Ki×θer(n); Kp is a proportional gain; Kd is a differential gain; and Ki is an integral gain.

Subsequently, at step 204, the control amount calculator 5 calculates a control current value "i" in accordance with the following formula (7) in the case of the PD control, or the following formula (8) in the case of the PID control:

$$i(n)=ic1(n)+ih=Kp\times\theta er(n)+Kd\times(\theta er(n)-\theta er(n-1)+0.5[A] \qquad (7),$$

$$i(n)=ic2(n)+ih=Kp\times\theta er(n)+Kd\times(\theta er(n)-\theta er(n-1))+\Sigma Ki(n)+0.5 [A] \qquad (8).$$

In these formulae (7) and (8), Kp is a proportional gain; Kd is a differential gain; and ip is a proportional value; id is a differential value; and ΣKi represents an integral value, namely ΣKi(n)=ΣKi(n−1)+Ki×θer(n), and Ki is an integral gain.

Then, at step 205, the control signal is outputted to the controller 6. This control signal is calculated based on the control current value i by the control amount calculator 5. In other words, while the holding current value ih (e.g., 0.5 A) is set as a reference, the actual advance angle amount θr is converged into the target advance amount θb in accordance with the control amount which is calculated based on the deviation θer between the target advance amount θb and the actual advance amount θr.

In the conventional control apparatus, since the control operation by the above-mentioned calculation is carried out every predetermined time (e.g., 25 ms) in the entire drive region, the detection sensitivity of the advance amount deviation θer is not sharp, depending upon the process timing in the high speed revolution region. As a result, the converging time of the actual advance amount with respect to the target advance amount is changed without calculating the proper control amounts (proportional value, differential value and the like), so that the response characteristic is deteriorated. As a consequence, there arise such problems as deterioration in the drive performance such as lowering of engine power, engine stalling and occurrences of abnormal vibrations as well as deterioration in exhaust gases.

In particular, in the high speed revolution region, when a large number of calculating process operations are carried out every predetermined crank angle position, the processing time is increased so that it becomes difficult to perform the intended function of the engine control system itself. Therefore, the processing workloads required in the high speed revolution must be reduced as much as possible.

SUMMARY OF THE INVENTION

In view of the above, the present invention is intended to solve the above-described problems, and therefore, has an object to provide a control apparatus for an internal combustion engine of the character described which is capable of performing better valve timing control irrespective of any engine operating condition without reducing variations in a response characteristic, while suppressing a large increase in the processing time executed every predetermined crank angle position in a high speed engine revolution.

Bearing the above object in mind, according to the present invention, there is provided a control apparatus for an internal combustion engine, comprising: an operating condition detector for detecting an operating condition of the internal combustion engine; a crank angle position detector for detecting a crank angle position of the engine; a variable valve timing mechanism for changing a valve timing of at least one of an intake valve and an exhaust valve so as to change a valve overlap amount of the intake and exhaust valves; an actual advance amount detector for detecting an actual valve timing position every predetermined crank angle position; a target advance amount setter for setting a target valve timing based upon a detection result of the operating condition detector; a controller for controlling the variable valve timing mechanism in such a manner that the actual advance amount detected by the actual advance amount detector is changed into the target advance amount set by the target advance amount setter; a advance amount deviation calculator for calculating a deviation between the target advance amount and the actual advance amount every predetermined crank angle position; a differential value calculator for calculating, every time predetermined time, a deviation between a current value of advance amount deviation and a preceding value thereof, which are calculated by the advance amount deviation calculator; and a control amount calculator for calculating a control amount used in the controller based upon both the advance amount deviation calculated by the advance amount deviation calculator and the differential value calculated by the differential value calculator.

Preferably, the control amount calculator calculates the control amount every predetermined crank angle position.

In a preferred form of the invention, the control apparatus further comprises an advance amount deviation storing element for storing therein the advance amount deviation calculated by the advance amount deviation calculator and for updating the stored advance amount deviation every predetermined time. The differential value calculator calculates a deviation between a current value of the advance amount deviation stored value and a preceding value thereof, which are stored by the advance amount deviation storing element every predetermined time.

In another preferred form of the invention, the control apparatus further comprises a second differential value calculator for calculating a deviation between a current value of the advance amount deviation and a preceding value thereof, which are calculated by the advance amount deviation calculator every predetermined crank angle position. The control amount calculator calculates the control amount of the controller every predetermined crank angle position based upon both the advance amount deviation calculated by the advance amount deviation calculator and the second differential value calculated by the second differential value calculator in such a case where the rotational number of the internal combustion engine is smaller than or equal to a predetermined rotational number.

BRIEF DESCRIPTION OF THE DRAWINGS

For a better understanding of the present invention, reference is made of a detailed description of preferred embodiments of the invention which is to be read in conjunction with the accompanying drawings, in which:

FIGS. 4(*a*) and 4(*b*) are flow charts showing control contents of the control apparatus according to the second embodiment of the present invention;

FIGS. 7(*a*)–7(*c*) are timing charts explaining the operation of a conventional control apparatus for an internal combustion engine and also the operations of the control apparatuses according to the first through third embodiments of the present invention;

DESCRIPTION OF THE PREFERRED EMBODIMENTS

Now, various preferred embodiments of the present invention will be described in detail while referring to the accompanying drawings.

Figure 8:
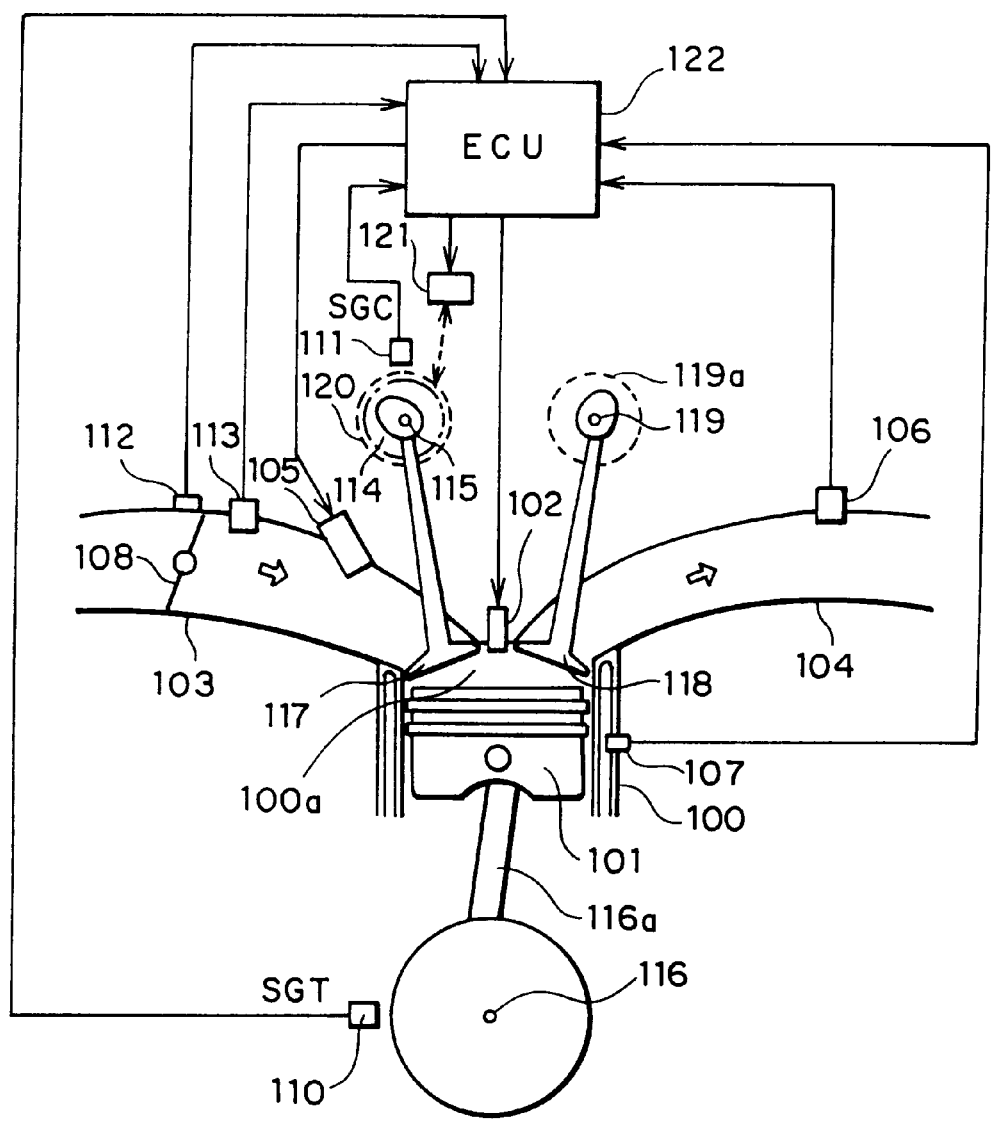
FIG. 8 is a schematic structural diagram of the conventional control apparatus for the internal combustion engine.

It should be understood that the same reference numerals shown in the conventional control system for the internal combustion engine of FIG. 8 will be employed as those for denoting the same or similar components employed in control apparatuses for an internal combustion engine according to various preferred embodiments of the present invention.

It should also be noted that although each of the preferred embodiments describes the control system for changing the valve timing of an air intake system alone, these embodiments may be similarly applied to a control system for changing the valve timing of an air exhaust system.

First Embodiment

Figure 1:
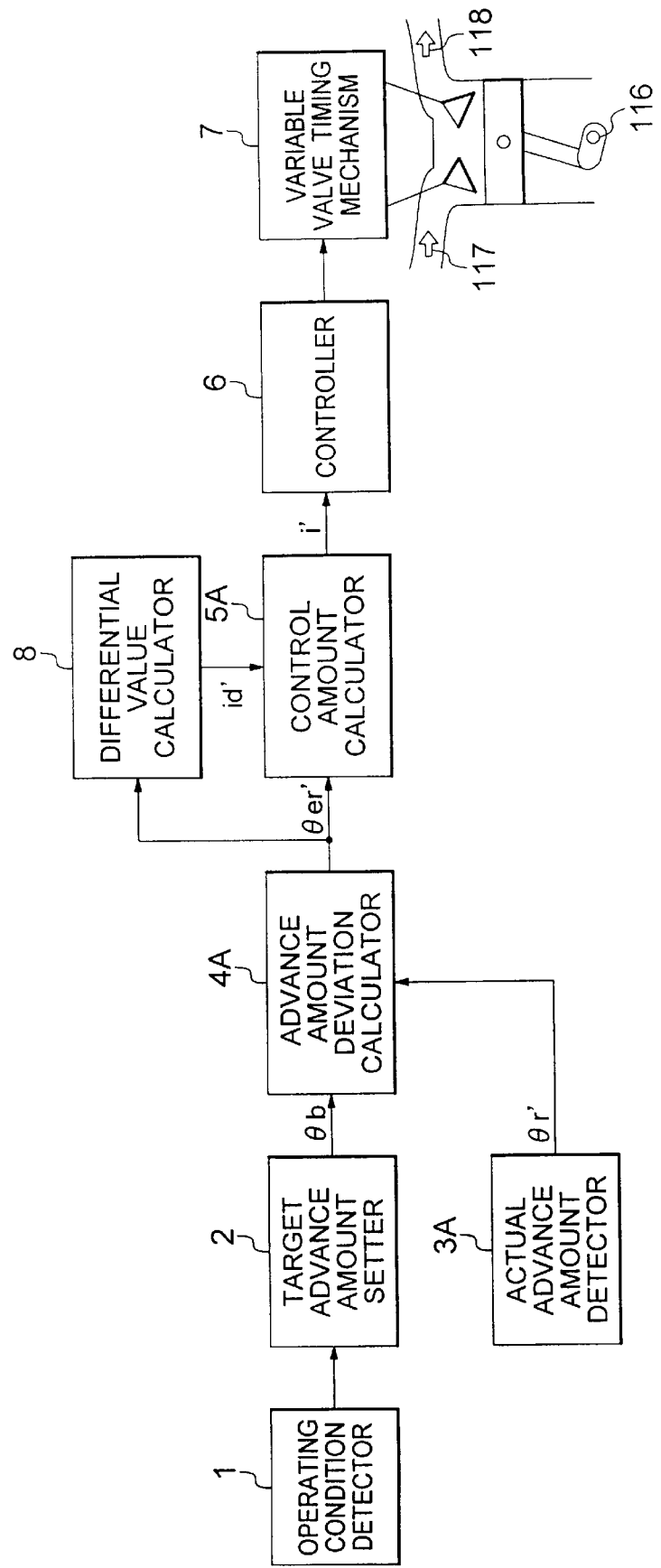
FIG. 1 is a schematic block diagram showing a basic arrangement of a control apparatus for an internal combustion engine according to a first embodiment of the present invention.

FIG. 1 schematically illustrates in block form the basic arrangement of a control apparatus for an internal combustion engine according to a first embodiment of the present invention.

Figure 9:
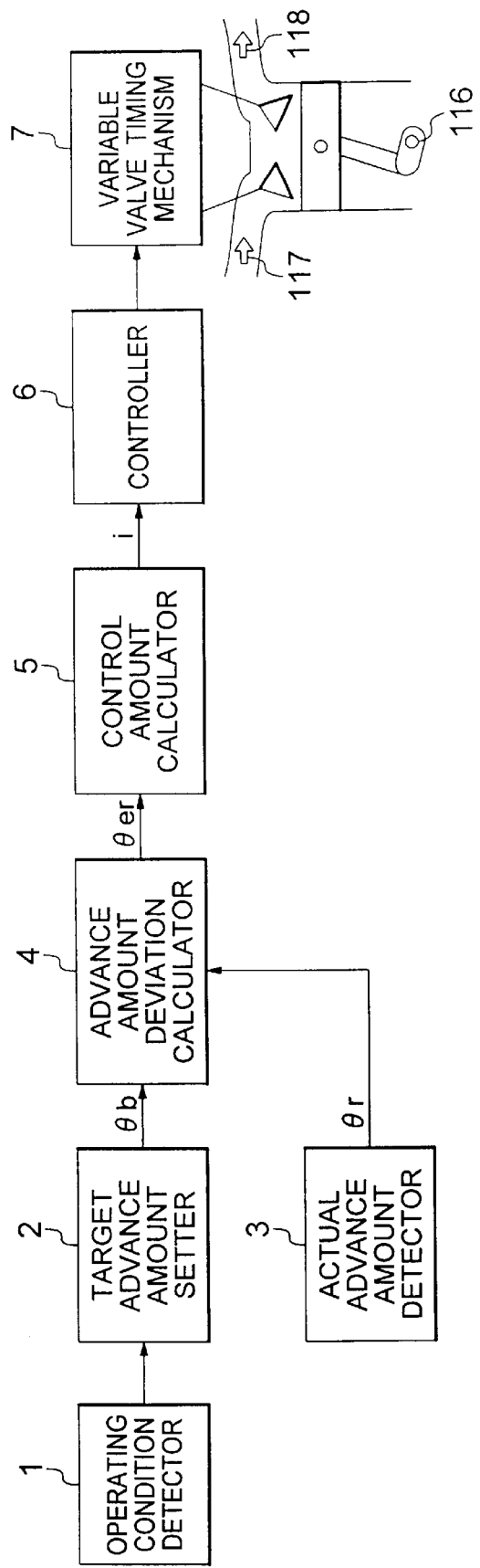
FIG. 9 is a block diagram representing the basic arrangement of the conventional control apparatus for the internal combustion engine.
Figure 10A:
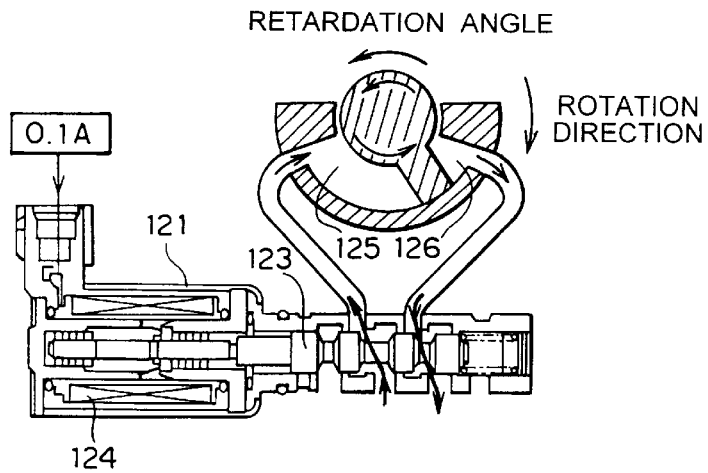
FIGS. 10(*a*) through 10(*c*) are sectional views showing an oil control valve and an oil pressure (hydraulic) actuator at their different operating states used to explain the operation of a variable valve timing mechanism.
Figure 10B:
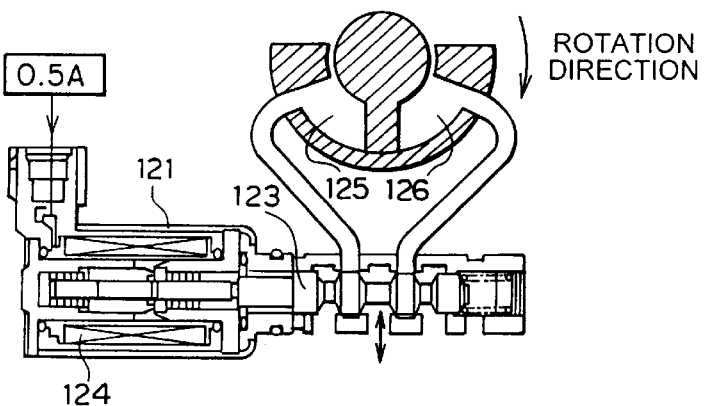
Figure 10C:
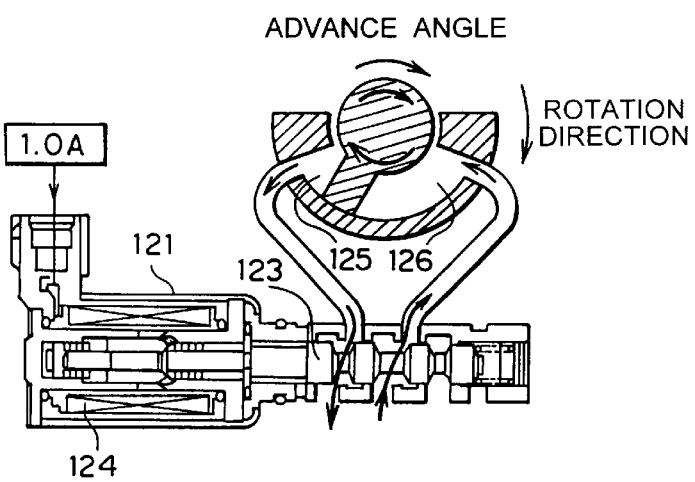
Figure 11:
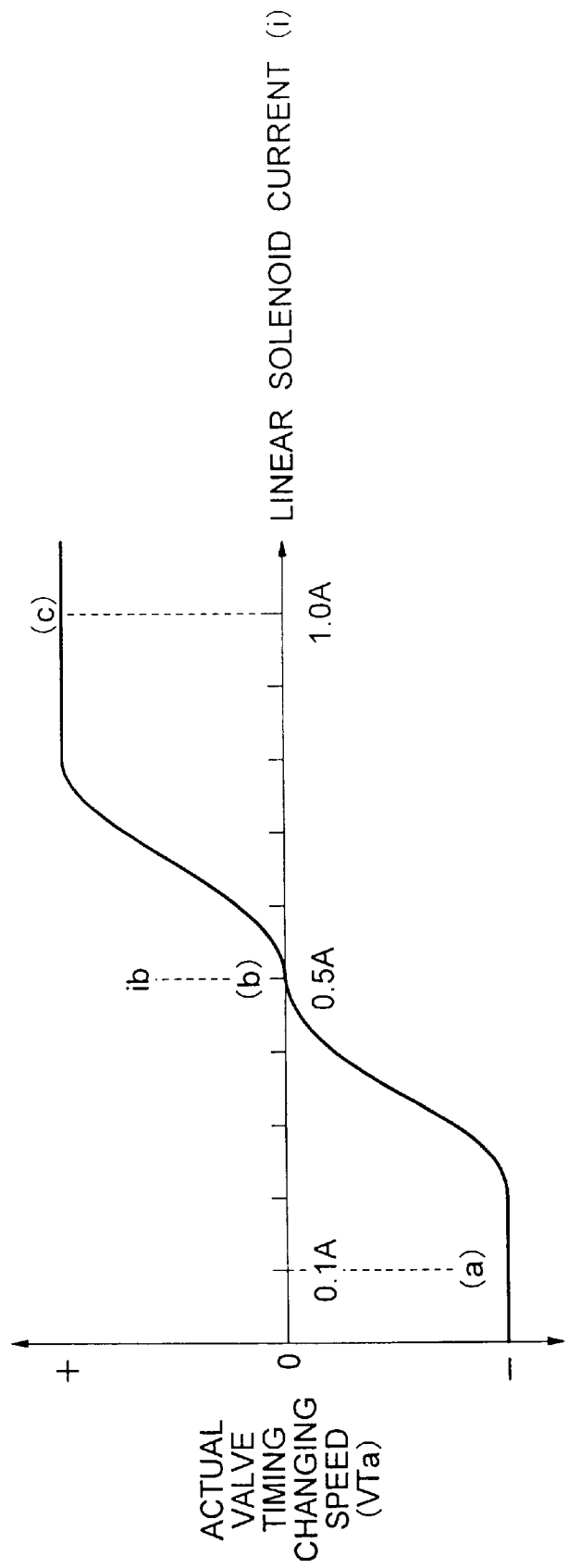
FIG. 11 is a characteristic diagram showing a relationship between an actual valve timing change speed and a linear solenoid current.
Figure 12:
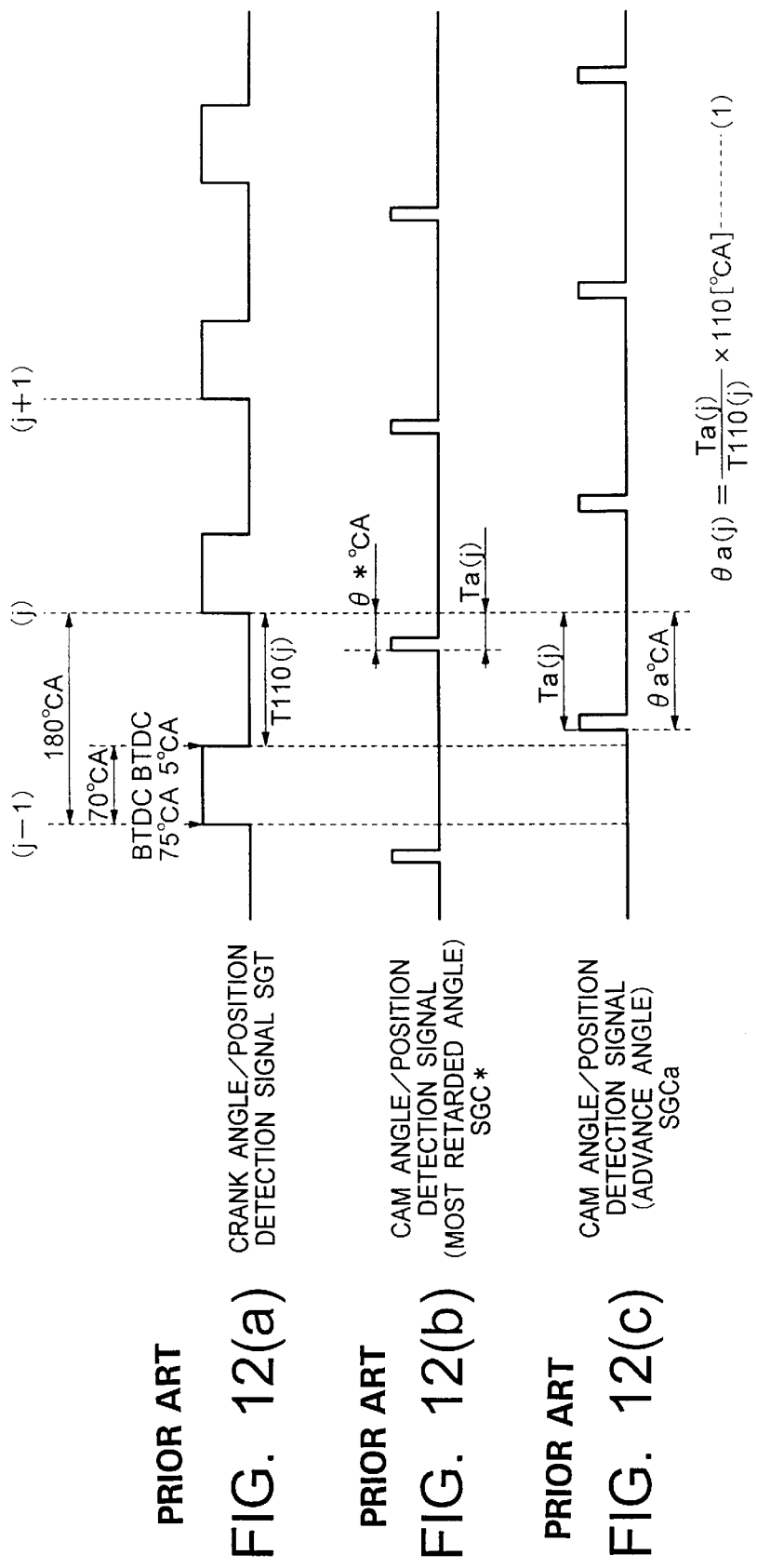
FIGS. 12(*a*) through 12(*c*) are timing charts representing a crank angle/position detection signal SGT corresponding to an output signal from a crank angle/position detection sensor, and cam angle/position detection signals SGC corresponding to an output signal from a cam angle/position detection sensor at different advance or retardation angles or positions, respectively.
Figure 13:
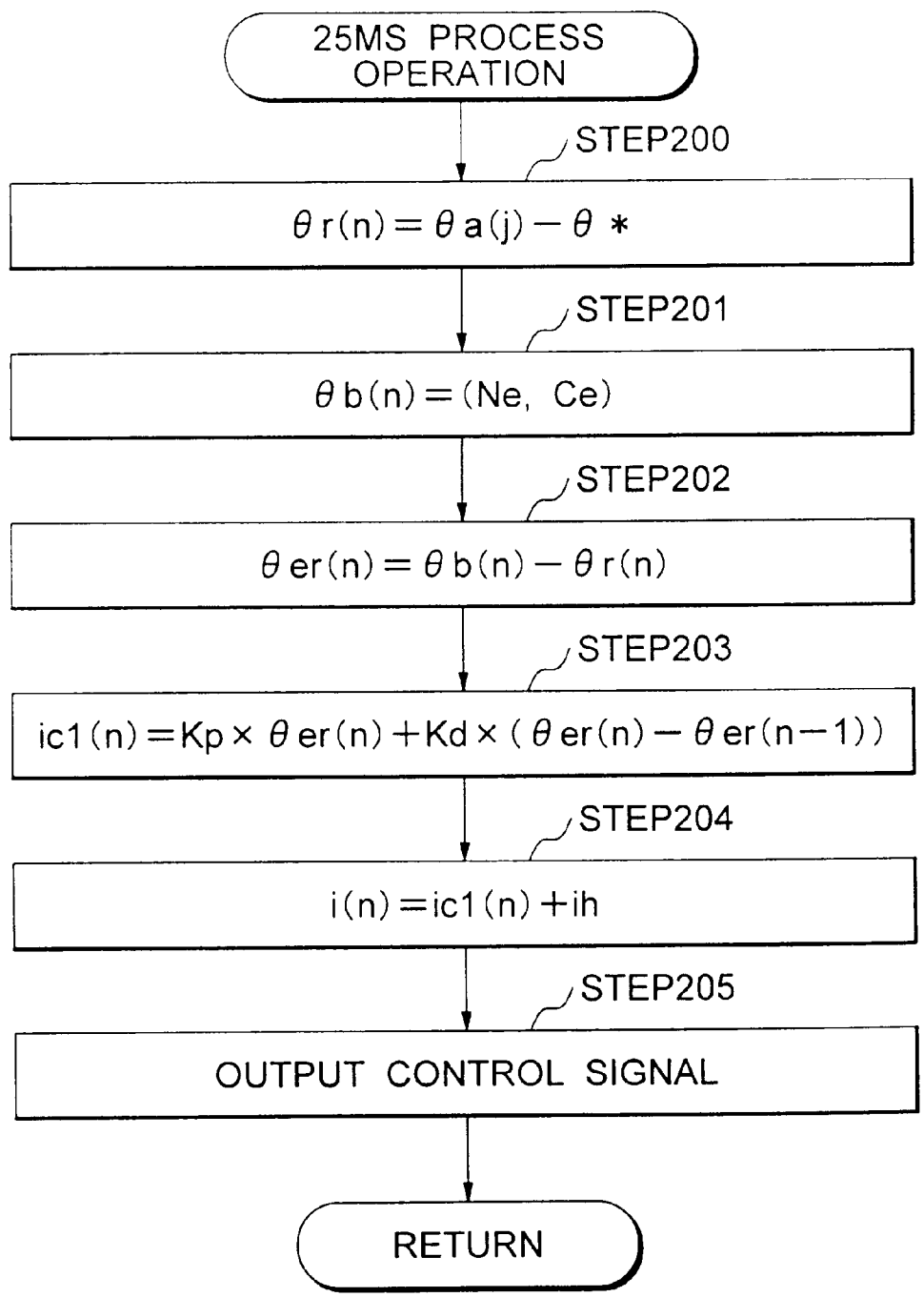
FIG. 13 is a flow chart showing a control content of the conventional control apparatus for the internal combustion engine.

As indicated in FIG. 1, a control apparatus for an internal combustion engine according to the first embodiment of the present invention includes an operating condition detector 1, a target advance amount setter 2, an actual advance amount detector 3A, an advance amount deviation calculator 4A, a control amount calculator 5A, a controller 6, and a variable valve timing mechanism 7, similar to the aforementioned conventional control apparatus shown in FIGS. 8 to 10.

Basically, contents of processing operations executed in both the actual advance amount detector 3A and the advance amount deviation calculator 4A are identical to those performed in the actual advance amount detector 3 and the advance amount deviation calculator 4 employed in the conventional control apparatus of FIG. 9 except for calculation process timing. In addition, the control amount calculator 5A does not contain differential calculations in addition to such a difference in the calculation process timing with respect to the control amount calculator 5 employed in the conventional control apparatus shown in FIG. 8.

A differential value calculator 8 calculates a deviation between a current value of advance amount deviation value "θer'" and a previous or preceding value thereof every time a predetermined time (for example, 25 ms) passes. These advance amount deviations are calculated by the advance amount deviation calculator 4A every predetermined crank angle position.

The control amount calculator 5A calculates a control amount "ic'" every predetermined crank angle position based upon both the advance amount deviation θer' calculated by the advance amount deviation calculator 4A and the differential value id' calculated by the differential value calculator 8.

FIGS. 7(a) through 7(c) are timing charts representing calculation results obtained by the target advance amount setter 2, the actual advance amount detector 3A, the advance amount deviation calculator 4A, and the differential value calculators 8 and 8A. Specifically, FIG. 7(a) represents a relationship between a target advance amount "θb" (indicated by a dot/dash line) set by the target advance amount setter 2 and an actual advance amount "θr'" (indicated by a solid line) detected by the actual advance amount detector 3A. FIG. 7(b) indicates deviation "θer" (solid line indicates a deviation of the present invention, and dot/dash line indicates a deviation of the prior art) between the target advance amount θb and the actual advance amount θr', which is calculated by the advance amount deviation calculator 4A. FIG. 7(c) shows differential values "id'" (indicated by a dot/dash line) and "id''" (indicated by a solid line) calculated by the differential value calculators 8 and 8A, respectively. It should be noted that in these timing charts of FIGS. 7(a) through 7(c), symbols (j−1), (j), (j+1) designate predetermined successive crank angles, and symbols (n−1), (n), (n+1) recurrent time intervals every predetermined continuous time (for example, 25 ms).

Referring now to flow charts shown in FIGS. 2(a) and 2(b), a control operation by the control apparatus for the internal combustion engine according to the first embodiment of the present invention will be described.

Figure 2A:
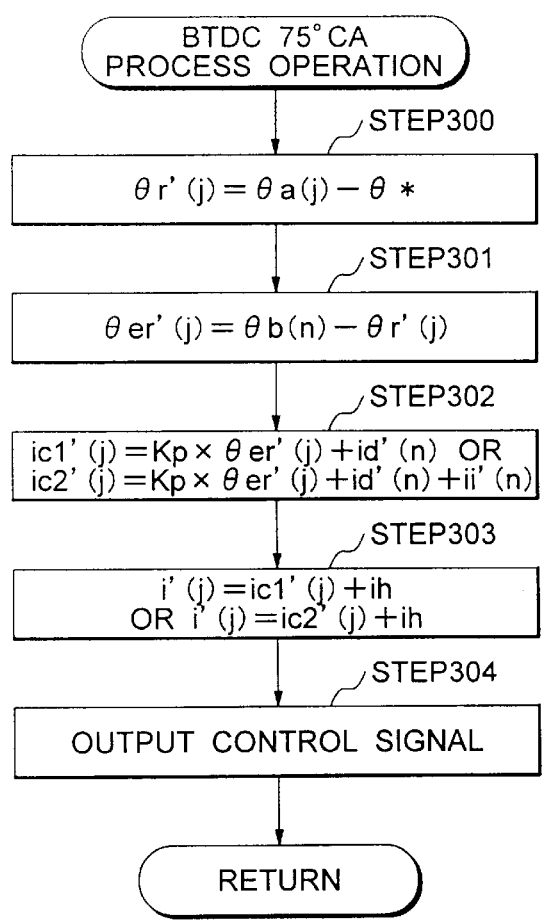
FIGS. 2(*a*) and 2(*b*) are flow charts showing control contents of the control apparatus according to the first embodiment of the present invention.
Figure 2B:
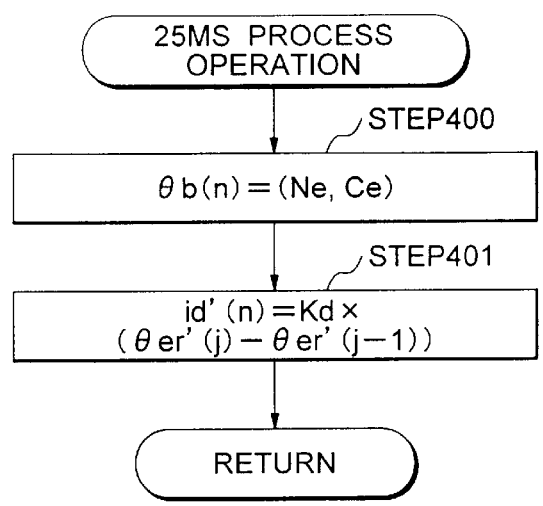

A flow chart shown in FIG. 2(a) indicates a process operation executed every predetermined crank angle position (for instance, BTDC75 CA), and a flow chart shown in FIG. 2(b) describes a process operation executed every time a predetermined time, (for example 25 ms) passes.

In FIG. 2(a), first at step 300, the actual advance amount detector 3A calculates the actual advance amount θr' by using the following formula (9) based upon both an actual valve timing detection value "θa" and a most retarded angle (retard angle) learning value "θ*", as shown in FIG. 7(a):

$$\theta r'(j) = \theta a(j) - \theta^* \, [°CA] \qquad (9)$$

Here, note that the actual advance amount θr', is equal to an advance amount of actual valve timing while setting the most retarded angle learning value θ* as a reference.

Next, at step 301, as indicated in FIG. 7(b), the advance amount deviation calculator 4A calculates a deviation θer'(j) between a target advance amount θb(n), which will be calculated at step 400 shown in FIG. 2(b), and an actual advance amount θr'(j) based upon the following formula (10):

$$\theta er'(j) = \theta b(n) - \theta r'(j) \, [°CA] \qquad (10)$$

At step 302, the control amount calculator 5A calculates a control amount ic'(j) based on the following formula (11) in the case where the PD control is carried out:

$$ic1'(j) = ip'(j) + id'(n) = Kp \times \theta er'(j) + id'(n) \, [A] \qquad (11),$$

where ip'(j) is a current proportional value at a predetermined crank angle; id'(n) is a current differential value calculated every predetermined time; and Kp represents a proportional gain. Also, the differential value id'(n) may be calculated by the differential value calculator 8 at step 401 of FIG. 2(b), which will be discussed later.

Also, when the PID control is performed, the control amount calculator 5A similarly calculates the PID control term based on the following formula (12):

$$ic2'(j) = ip'(j) + id'(n) + ii'(n) = Kp \times \theta er'(j) + id'(n) + ii'(n) \, [A] \qquad (12),$$

where ii'(n) is an integral term, namely ii'(n)=ΣKi(n)=ΣKi(n−1)+Ki×θer'(j); Kp is a proportional gain; and Ki is an integral gain.

Next, at step 303, the control amount calculator 5A calculates a control current value i'(j) based upon the deviation θer' outputted from the advance amount deviation calculator 4A and the differential value id' of the differential value calculator 8 in accordance with the following formula

(13) in the case of the PD control, or with the following formula (14) in the case of the PID control:

$$i'(j)=ic1'(j)+ih=Kp\times\theta er'(j)+Kd\times\theta er'(n)-\theta er'(n-1))+0.5 \ [A] \quad (13),$$

or $$i'(j)=ic2'(j)+ih=Kp\times\theta er'(j)+Kd\times(\theta er'(n)-\theta er'(n-1))=\Sigma Ki(n-1)+Ki\times\theta er'(j)+0.5 \ [A] \quad (14).$$

In these formulae (13) and (14), Kp is a proportional gain; Kd is a differential gain; and ih is a holding current value. In this case, the holding current value is set to 0.5 [A].

Then, at step 304, the control signal is outputted to the controller 6. This control signal is calculated based on the control current value i' by the control amount calculator 5A. In other words, while the holding current value ih (for example, 0.5 A) is set as a reference, the actual advance angle amount θr' is converged into the target advance amount θb in accordance with the control amount which is calculated based on the deviation θer', between the target advance amount angle θb and the actual advance amount θr'.

On the other hand, in the process operation executed every predetermined time (for example, 25 ms) shown in the flow chart of FIG. 2(b), at step 400, the target advance amount setter 2 sets an optimum target advance amount "θb" under the current operating condition based on the current operating condition (engine rotational number "Ne" and charging efficiency "Ce") detected by the operating condition detector 1 from a map between the engine rotational number Ne and the charging efficiency Ce:

$$\theta b = (Ne, Ce) \ [°CA] \quad (15).$$

Next, at step 401, as indicated by a dot/dash line of FIG. 7(c), the differential value calculator 8 calculates a current differential value id'(n) from both a current value θer'(j) of the advance amount deviation and a preceding value θer'(j−1) thereof every time a predetermined time (for example, 25 ms) passes in accordance with the following formula (16):

$$id'(n)=Kd\times(\theta er'(j)-\theta er'(j-1)) \ [A] \quad (16),$$

where "Kd" is a differential gain.

Also, when the PID control is carried out, an integral value ii' is similarly calculated every predetermined time.

In accordance with the first embodiment, the calculations by the ECU 122 are separately carried out, that is, the entire process operation thereof is divided into a first process operation including step 300 to step 303 in FIG. 2(a), which requires high speed processing, and a second process operation including step 400 and step 401 in FIG. 2(b)) which does not require such high speed processing. In other words, the process operation requiring high speed processing (in particular, calculation of a proportional term {(ip'(j)=Kp×(θer'(j)} of step 302) is executed every predetermined crank angle, whereas the process operation which does not require such high speed processing (in particular, calculation of a differential value id'(n) and an integral term ii'(n) at step 401) is executed every predetermined time interval. As a result, while suppressing a large increase in the processing time executed at the high speed revolution every predetermined crank angle position, the amount of process operation required during the high speed revolution is reduced, so that the engine control system can be readily established. Furthermore, the calculating operations of the differential value id' (n) and the integral term ii'(n), which may require relatively long calculation time, are not carried out every predetermined crank angle, but instead are carried out every predetermined time. As a consequence, even when the engine is rotated at a high speed revolution, both the differential value id'(n) and the integral term ii'(n) can be calculated without fail, fluctuations or variations in the converging time of the actual advance amount with respect to the target advance amount can be reduced. Thus, better valve timing control can be carried out irrespective of the engine operating condition by preventing deterioration in the drive performance such as lowering of engine power, engine stalling, and occurrences of abnormal vibrations, as well as deterioration in exhaust gases.

Second Embodiment

Figure 3:
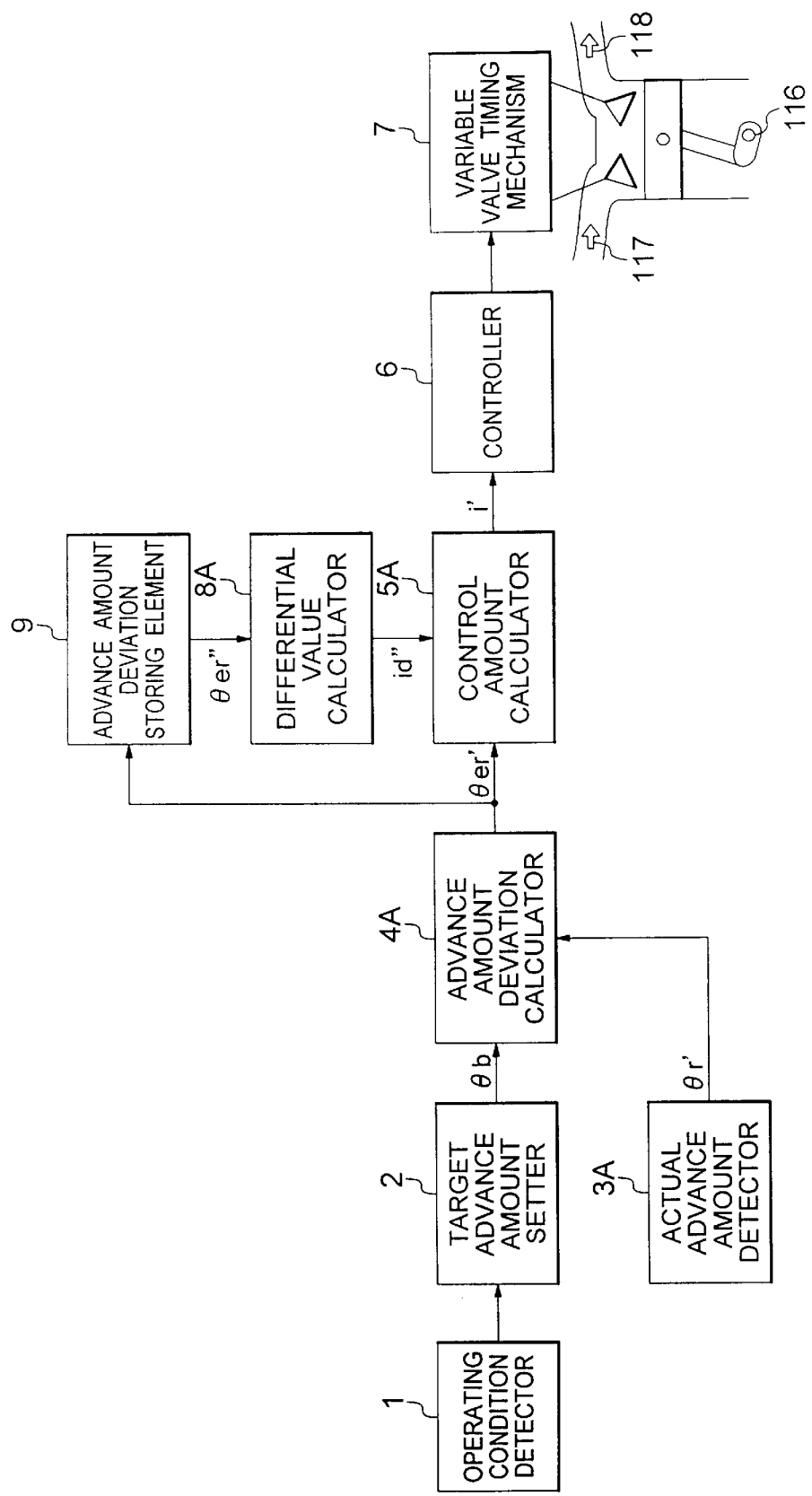
FIG. 3 is a schematic block diagram showing a basic arrangement of a control apparatus for an internal combustion engine according to a second embodiment of the present invention.

FIG. 3 is a schematic block diagram showing the basic arrangement of a control apparatus for an internal combustion engine according to a second embodiment of the present invention.

As indicated in FIG. 3, the control apparatus for the internal combustion engine according to the second embodiment of the present invention is substantially similar in construction to the above-described control apparatus for the internal combustion engine according to the first embodiment. That is, this control apparatus includes an operating condition detector 1, a target advance amount setter 2, an actual advance amount detector 3A, an advance amount deviation calculator 4A, a control amount calculator 5A, a controller 6, and a valve timing mechanism 7. In addition, the control apparatus of the second embodiment further includes a differential value calculator 8A and an advance amount deviation storing element 9.

The advance amount deviation storing means 9 stores therein an advance amount deviation value θer' which is calculated by the advance amount deviation calculator 4A every crank angle position, and also updates this stored advance amount deviation every predetermined time (for example, 25 ms). The differential value calculator 8A calculates a deviation between a currently stored value and a previously stored value of the advance amount deviation storing element 9.

Now, the control operation of the control apparatus for the internal combustion engine according to the second embodiment of the present invention will be explained while referring to a flow chart shown in FIG. 4.

A flow chart shown in FIG. 4(a) indicates a process operation (for example, in case of a 4-cylinder engine, at an engine rotational number Ne=4000 rpm, a process operation is performed every 7.5 ms) executed every predetermined crank angle position (e.g., BTDC75° CA), and a flow chart shown in FIG. 4(b) shows a process operation executed every predetermined time (e.g., 25 ms).

The content of the flow chart shown in FIG. 4(a) is substantially the same as that of the flow chart indicated in FIG. 2(a). However, only a process operation performed at step 302' is different. That is, at the step 302', in the case where the PD control is carried out, the control amount calculator 5A calculates a control amount ic'(j) in accordance with the following formula (11'):

$$ic1'(j)=ip'(j)+id''(n)=Kp\times\theta er'(j)+id''(n) \ [A] \quad (11'),$$

where ip'(j) is a current proportional value at a predetermined crank angle; id"(n) is a current differential value calculated every predetermined time; and Kp is a proportional gain. Also, the differential value id"(n) may be calculated by the differential value calculator 8A at step 502 shown in FIG. 4(b), which will be explained later.

Also, when the PID control is performed, the control amount calculator 5A similarly calculates the PID control term based on the following formula (12'):

$$ic2'(j)=ip'(j)+id''(n)+ii''(n)=Kp\times\theta er'(j)+id''(n)+ii''(n) \text{ [A]} \qquad (12'),$$

where ii''(n) is an integral term, namely ii''(n)=ΣKi(n)=ΣKi(n−1)+Ki×θer'(j); Kp is a proportional gain, and Ki is an integral gain.

As to the flow chart shown in FIG. 4(b), step 500 is identical to step 400 of the flow chart shown in FIG. 2(b), and step 501 is newly added, and step 401 of FIG. 2(b) is replaced by step 502.

At step 501, the latest advance amount deviation θer' which is calculated by the advance amount deviation calculator 4A every time predetermined time (for example, 25 ms) is read out and stored into the advance amount deviation storing element 9:

$$\theta er''(n)=\theta er'(j) \text{ [°CA]} \qquad (17).$$

Subsequently, similar to the previous step 402 of FIG. 2, as indicated by a solid line of FIG. 7(c), at step 502, the differential value calculator 8A calculates a differential value id'' every predetermined time (for example, 25 ms) in accordance with the following formula (18), while using a current value θer''(n) and a preceding value θer''(n−1) of the advance amount deviation storage value θer'':

$$id''(n)=Kd\times(\theta er''(n)-\theta er''(n-1) \text{ [A]} \qquad (18),$$

where Kd is a differential gain.

In the case of the PID control, an integral value ii''(n) is similarly calculated every predetermined time.

In accordance with the second embodiment, the substantially same effect as that of the above-described first embodiment can be achieved. However, as apparent from FIG. 7(c), when the target advance amount θb' is rapidly changed, the rising of the actual advance amount θr' for the differential value id''(n) (indicated by a solid line) can be made sharper than that for the differential value id'(n) (indicated by a dot/dash line). As a consequence, the converging time of the actual advance amount with respect to the target advance amount can be reduced.

Third Embodiment

Figure 5:
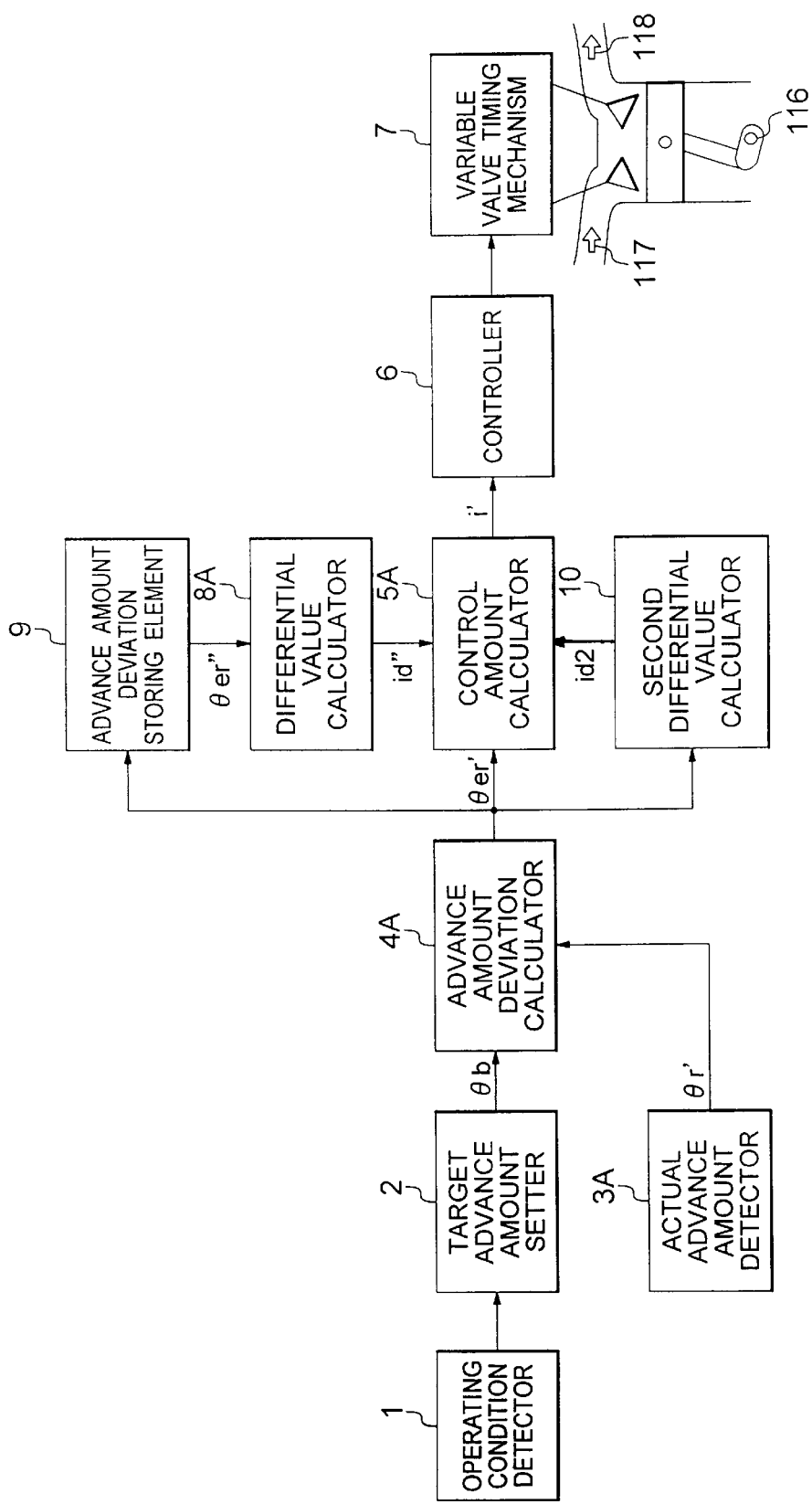
FIG. 5 is a schematic block diagram showing a basic arrangement of a control apparatus for an internal combustion engine according to a third embodiment of the present invention.

FIG. 5 is a schematic block diagram showing the basic arrangement of a control apparatus for an internal combustion engine according to a third embodiment of the present invention.

As indicated in FIG. 5, the control apparatus for the internal combustion engine according to the third embodiment of the present invention is substantially similar in construction to the control apparatus for the internal combustion engine according to the second embodiment. That is, the control apparatus of the third embodiment includes an operating condition detector 1, a target advance amount setter 2, an actual advance amount detector 3A, an advance amount deviation calculator 4A, a control amount calculator 5A, a controller 6, a variable valve timing mechanism 7, a differential value calculator 8A, and an advance amount deviation storing means 9. In addition, the control apparatus of the third embodiment further includes a second differential value calculator 10 which calculates, every predetermined crank angle position, a deviation between a current value of an advance amount deviation θer' and a preceding value thereof, which are calculated every predetermined crank angle position.

Now, the control operation of the control apparatus for the internal combustion engine according to the third embodiment of the present invention will be described while referring to flow charts shown in FIGS. 6(a) and 6(b).

Figure 6B:
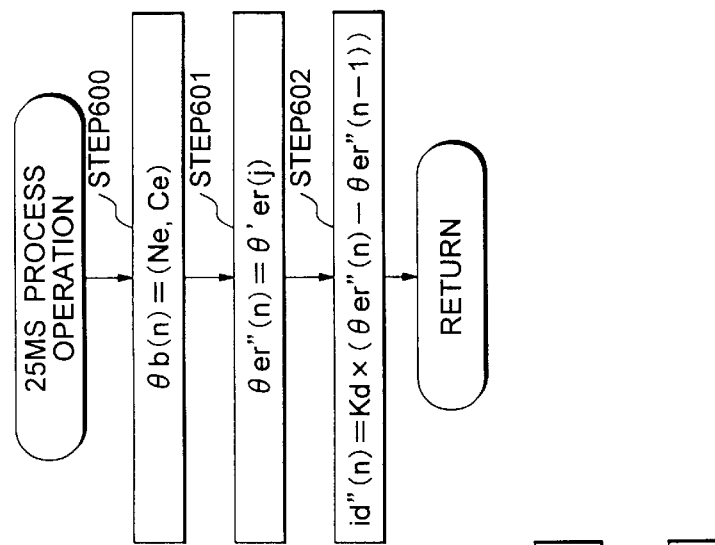
FIGS. 6(*a*) and 6(*b*) are flow charts showing control contents of the control apparatus according to the third embodiment of the present invention.
Figure 6A:
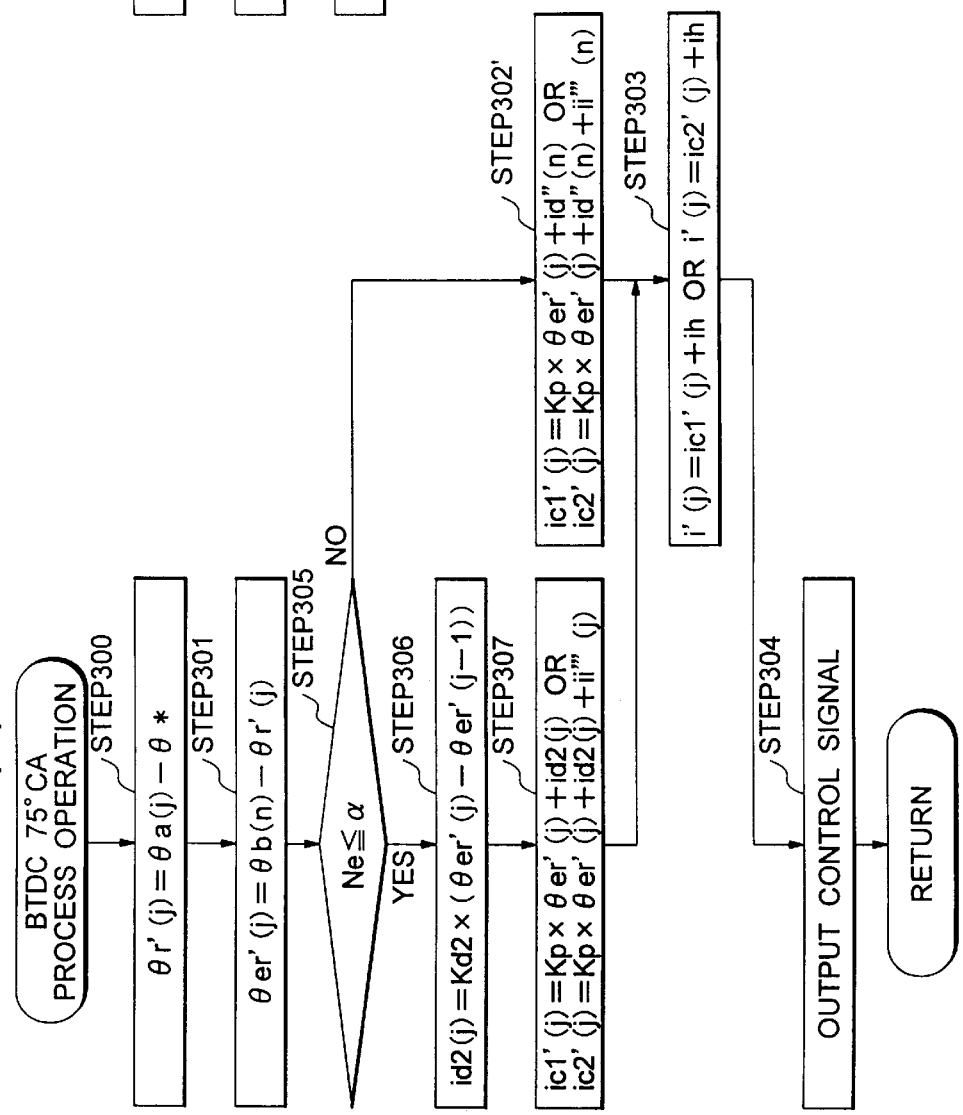

A flow chart shown in FIG. 6(a) indicates a process operation executed every predetermined crank angle position (for instance, BTDC75 CA), and a flow chart shown in FIG. 6(b) describes a process operation executed every predetermined time (for example 25 ms).

The content of the flow chart shown in FIG. 6(b) is completely identical to that of the flow chart shown in 4(b). That is to say, process operations including step 600, step 601 and step 602 in FIG. 6(b) are identical to those of step 500, step 501 and step 502 in FIG. 4(b).

In the flow chart of FIG. 6(a), the process operations including step 300, step 301, step 302' and step 303 are identical to those of step 300, step 301, step 302', step 303 and step 304 in FIG. 4(a). In the flow chart of FIG. 6(a), process operations including step 305, step 306 and step 307 are newly added.

At step 305, the controller 6 judge as to whether the engine rotational number "Ne" is smaller than or equal to a predetermined value "α". When the judgment result is "NO", namely when the engine rotational number Ne exceeds the predetermined value α, since the engine is run at a high speed, the control operation is sequentially advanced to step 302', step 303, and step 304 at which similar process operations to those of the second embodiment are carried out.

On the other hand, when the judgment result of step 305 becomes "YES", the control operation is advanced to a further step 306. At this step 306, the differential value calculator 8A calculates a differential value id2(j) every predetermined crank angle in accordance with the following formula (19):

$$id2(j)=Kd2\times(\theta er'(j)-1\theta er'(j-1)) \text{ [A]} \qquad (19),$$

where symbol Kd2 is a differential gain.

Next, at step 307, in the case where the PD control is carried out, the control amount calculator 5A calculates a control amount ic1'(j) in accordance with the following formula (20):

$$ic1'(j)=ip'(j)+id2(j)=Kp\times\theta er'(j)+id2(j) \text{ [A]} \qquad (20),$$

where symbol ip'(j) is a proportional value at a predetermined crank angle.

Also, when the PID control is performed, the control amount calculator 5A similarly calculates the PID control term based on the following formula (21):

$$ic2'(j)=ip'(j)+id2(j)+ii'''(j)=Kp\times\theta er'(j)+id2(j)+ii'''(j) \text{ [A]} \qquad (21),$$

where ii'''(j) is an integral term, namely ii'''(j)=ΣKi(j)=ΣKi(j−1)+Ki×θer'(j); Kp is a proportional gain; and Ki is an integral gain.

Subsequently, at step 303, the control amount calculator 5A calculates a control current value i'(j) based upon the deviation θer' outputted from the advance amount deviation calculator 4A and the differential value id2 of the second differential value calculator 10 in accordance with the following formula (22) in the case of the PD control, or with the following formula (23) in the case of the PID control:

$$i'(j)=ic1'(j)+ih=Kp\times\theta er'(j)+Kp2\times(\theta er'(j)-\theta er'(j-1))+0.5 \text{ [A]} \qquad (22),$$

or $$i'(j)=ic2'(j)+ih=Kp\times\theta er'(j)+Kd2\times(\theta er'(j)-\theta er'(j-1))+\Sigma Ki(j-1)+Ki\times\theta er'(j)+0.5 \text{ [A]} \qquad (23).$$

In these formulae (22) and (23), Kp is a proportional gain; Kd is a differential gain; and ih is a holding current value. In this case, the holding current value is set to 0.5 [A].

Then, at step 304, the control signal is outputted to the controller 6. This control signal is calculated based on the control current value i' by the control amount calculator 5A. In other words, while the holding current value ih (for example, 0.5 A) of the oil control valve 121 is set as a reference, the actual advance angle amount θr' is converged into the target advance amount θb in accordance with the control amount which is calculated based on the deviation θer' between the target advance amount θb and the actual advance amount θr'.

In accordance with the third embodiment, the following effect can be achieved in addition to the effects achieved by the above-mentioned first and second embodiments. That is, when the engine is run at a low speed, since the differential value id2 is calculated every predetermined crank angle, the better valve timing control can be realized even in such a low speed engine drive operation.

Alternatively, in the above-mentioned first through third embodiments, an insensitive range may be provided after step 301, by which when the deviation θer'(j) is smaller than or equal to a predetermined value β, the deviation θer'(j) is set to zero, otherwise when the deviation is not smaller than or equal to the value β, the control operation is advanced to the next step.

As described above, a control apparatus for an internal combustion engine according to the present invention includes: an operating condition detector for detecting an operating condition of the internal combustion engine; a crank angle position detector for detecting a crank angle position of the engine; a variable valve timing mechanism for changing a valve timing of at least one of an intake valve and an exhaust valve so as to change a valve overlap amount of the intake and exhaust valves; an actual advance amount detector for detecting an actual valve timing position every predetermined crank angle position; a target advance amount setter for setting a target valve timing based upon a detection result of the operating condition detector; a controller for controlling the variable valve timing mechanism in such a manner that the actual advance amount detected by the actual advance amount detector is changed into the target advance amount set by the target advance amount setter; a advance amount deviation calculator for calculating a deviation between the target advance amount and the actual advance amount every predetermined crank angle position; a differential value calculator for calculating, every time predetermined time, a deviation between a current value of advance amount deviation and a preceding value thereof, which are calculated by the advance amount deviation calculator; and a control amount calculator for calculating a control amount used in the controller based upon both the advance amount deviation calculated by the advance amount deviation calculator and the differential value calculated by the differential value calculator.

With the above arrangement, it is possible to effectively suppress a large increase in the processing time executed every predetermined crank angle position at a high speed revolution. In addition, the process operation required during the high speed revolution is reduced so that the engine control system can be readily constructed without difficulty. Furthermore, fluctuations or variations in the converging time of the actual advance amount with respect to the target advance amount can be reduced. Thus, better valve timing control can be carried out irrespective of the engine operating condition by preventing deterioration in the drive performance such as lowering of engine power, engine stalling and occurrences of abnormal vibrations, as well as deterioration in exhaust gases.

Moreover, the control apparatus may further include an advance amount deviation storing element for storing therein the advance amount deviation calculated by the advance amount deviation calculator and for updating the stored advance amount deviation every predetermined time, and the differential value calculator calculates a deviation between a current value of the advance amount deviation stored value and a preceding value thereof, which are stored by the advance amount deviation storing element every predetermined time.

With this arrangement, when the target advance amount is rapidly changed, the rising of the actual advance amount can be made sharp so that the converging time of the actual advance amount with respect to the target advance amount can be further decreased.

Furthermore, the control apparatus may further includes a second differential value calculator for calculating a deviation between a current value of the advance amount deviation and a preceding value thereof, which are calculated by the advance amount deviation calculator every predetermined crank angle position, and the control amount calculator calculates the control amount of the controller every predetermined crank angle position based upon both the advance amount deviation calculated by the advance amount deviation calculator and the second differential value calculated by the second differential value calculator in such a case where the rotational number of the internal combustion engine is smaller than or equal to a predetermined rotational number.

With this arrangement, when the engine is run at a low speed, the deviation between the current value of the advance amount deviation and the preceding value thereof is calculated every predetermined crank angle, so that better valve timing control can be realized even during such a low speed engine operation.

What is claimed is:

1. A control apparatus for an internal combustion engine, comprising:

an operating condition detector for detecting an operating condition of the internal combustion engine;

a crank angle position detector for detecting a crank angle position of the engine;

a variable valve timing mechanism for changing a valve timing of at least one of an intake valve and an exhaust valve so as to change a valve overlap amount of said intake and exhaust valves;

an actual advance amount detector for detecting an actual valve timing position every predetermined crank angle position;

a target advance amount setter for setting a target valve timing based upon a detection result of said operating condition detector;

a controller for controlling said variable valve timing mechanism in such a manner that the actual advance amount detected by said actual advance amount detector is changed into the target advance amount set by said target advance amount setter;

an advance amount deviation calculator for calculating a deviation between said target advance amount and said actual advance amount every predetermined crank angle position;

a differential value calculator for calculating, at every predetermined time interval, a deviation between a current value of advance amount deviation and a preceding value thereof, which are calculated by said advance amount deviation calculator; and a control amount calculator for calculating a control amount used in said controller based upon both the advance amount deviation calculated by said advance amount deviation calculator and the differential value calculated by said differential value calculator.

2. The control apparatus for an internal combustion engine according to claim 1, wherein said control amount calculator calculates the control amount every predetermined crank angle position.

3. The control apparatus for an internal combustion engine according to claim 1, further comprising an advance amount deviation storing element for storing therein the advance amount deviation calculated by said advance amount deviation calculator and for updating said stored advance amount deviation every predetermined time, wherein said differential value calculator calculates a deviation between a current value of the advance amount deviation stored value and a preceding value thereof, which are stored by said advance amount deviation storing element every predetermined time.

4. The control apparatus for an internal combustion engine according to claim 1, further comprising a second differential value calculator for calculating a deviation between a current value of the advance amount deviation and a preceding value thereof, which are calculated by said advance amount deviation calculator every predetermined crank angle position, wherein said control amount calculator calculates the control amount of said controller every predetermined crank angle position based upon both the advance amount deviation calculated by said advance amount deviation calculator and said second differential value calculated by said second differential value calculator in such a case where the rotational number of said internal combustion engine is smaller than or equal to a predetermined rotational number.

* * * * *